US009075500B2

(12) United States Patent
Hess et al.

(10) Patent No.: US 9,075,500 B2
(45) Date of Patent: Jul. 7, 2015

(54) METHOD AND SYSTEM FOR PRESENTING AND NAVIGATING EMBEDDED USER INTERFACE ELEMENTS

(71) Applicants: Eduard Hess, Wiesloch (DE); Daniel Jakobs, Ettlingen-Bruchhausen (DE); Dagmar Opitz, Sandhausen (DE); Mariya Pavlenko, Mannheim (DE); Arnulf Schueler, Heidelberg (DE); Lan Zhang, Wiesloch (DE)

(72) Inventors: Eduard Hess, Wiesloch (DE); Daniel Jakobs, Ettlingen-Bruchhausen (DE); Dagmar Opitz, Sandhausen (DE); Mariya Pavlenko, Mannheim (DE); Arnulf Schueler, Heidelberg (DE); Lan Zhang, Wiesloch (DE)

(73) Assignee: SAP SE, Walldorf (DE)

( * ) Notice: Subject to any disclaimer, the term of this patent is extended or adjusted under 35 U.S.C. 154(b) by 323 days.

(21) Appl. No.: 13/686,071

(22) Filed: Nov. 27, 2012

(65) Prior Publication Data

US 2014/0149900 A1    May 29, 2014

(51) Int. Cl.
*G06F 3/0481* (2013.01)
*G06F 3/00* (2006.01)
*G06F 3/048* (2013.01)

(52) U.S. Cl.
CPC .............. *G06F 3/0481* (2013.01); *G06F 3/00* (2013.01); *G06F 3/048* (2013.01)

(58) Field of Classification Search
CPC ................................. G06F 3/048; G06F 3/00
USPC ......................................... 715/765, 758, 738
See application file for complete search history.

(56) References Cited

U.S. PATENT DOCUMENTS

| 8,091,030 | B1 * | 1/2012 | Ballagh et al. | 715/738 |
|---|---|---|---|---|
| 8,201,096 | B2 * | 6/2012 | Robert et al. | 715/767 |
| 8,516,038 | B2 * | 8/2013 | Jalon et al. | 709/203 |
| 8,560,967 | B2 * | 10/2013 | Heo | 715/838 |
| 8,607,166 | B2 * | 12/2013 | Jalon et al. | 715/838 |
| 8,661,036 | B2 * | 2/2014 | Turski et al. | 707/737 |
| 8,762,887 | B2 * | 6/2014 | Jalon et al. | 715/838 |
| 2010/0115457 | A1 * | 5/2010 | Bombolowsky et al. | 715/782 |
| 2014/0317539 | A1 * | 10/2014 | Unpingco et al. | 715/764 |
| 2015/0019537 | A1 * | 1/2015 | Neels et al. | 707/722 |

* cited by examiner

*Primary Examiner* — David Phantana Angkool
(74) *Attorney, Agent, or Firm* — Buckley, Maschoff & Talwalkar LLC

(57) ABSTRACT

A method and system to define attributes of a plurality of interactive user interface elements, the attributes including, at least, a textual descriptor and a value representation of an associated data element; associate at least one of the interactive user interface elements into a group of user interface elements; and display, embedded in a user interface of a first application, the group including a presentation of the textual descriptor and the value representation of the associated data element for each interactive user interface element in the group.

18 Claims, 6 Drawing Sheets

METHOD AND SYSTEM FOR PRESENTING AND NAVIGATING EMBEDDED USER INTERFACE ELEMENTS

FIELD

Some embodiments relate to a user interface. In particular, some embodiments concern methods and systems for presenting and navigating user interface elements embedded in applications.

BACKGROUND

User interfaces, including graphical user interfaces, are increasingly being used to provide a mechanism for human users to receive information from machines and systems, as well as a means to interact with those machines and systems. A graphical user interface may convey a wide variety of data to a user via one or more user interface elements. In some contexts, the machines and systems may include computing devices and systems such as stand alone and/or networked computers. In some other contexts, a graphical user interface may be newly coupled to machines and systems such a tools, appliances, and devices previously not typically known to incorporate graphical user interfaces.

In some instances, a particular data element or set of data relevant to a user of, for example, a software application or service having a user interface may not be readily visible or clearly highlighted in a presentation of the user interface. As such, it may be beneficial to clearly, succinctly, and efficiently present information relevant to a user by a user interface.

DETAILED DESCRIPTION

Figure 1:
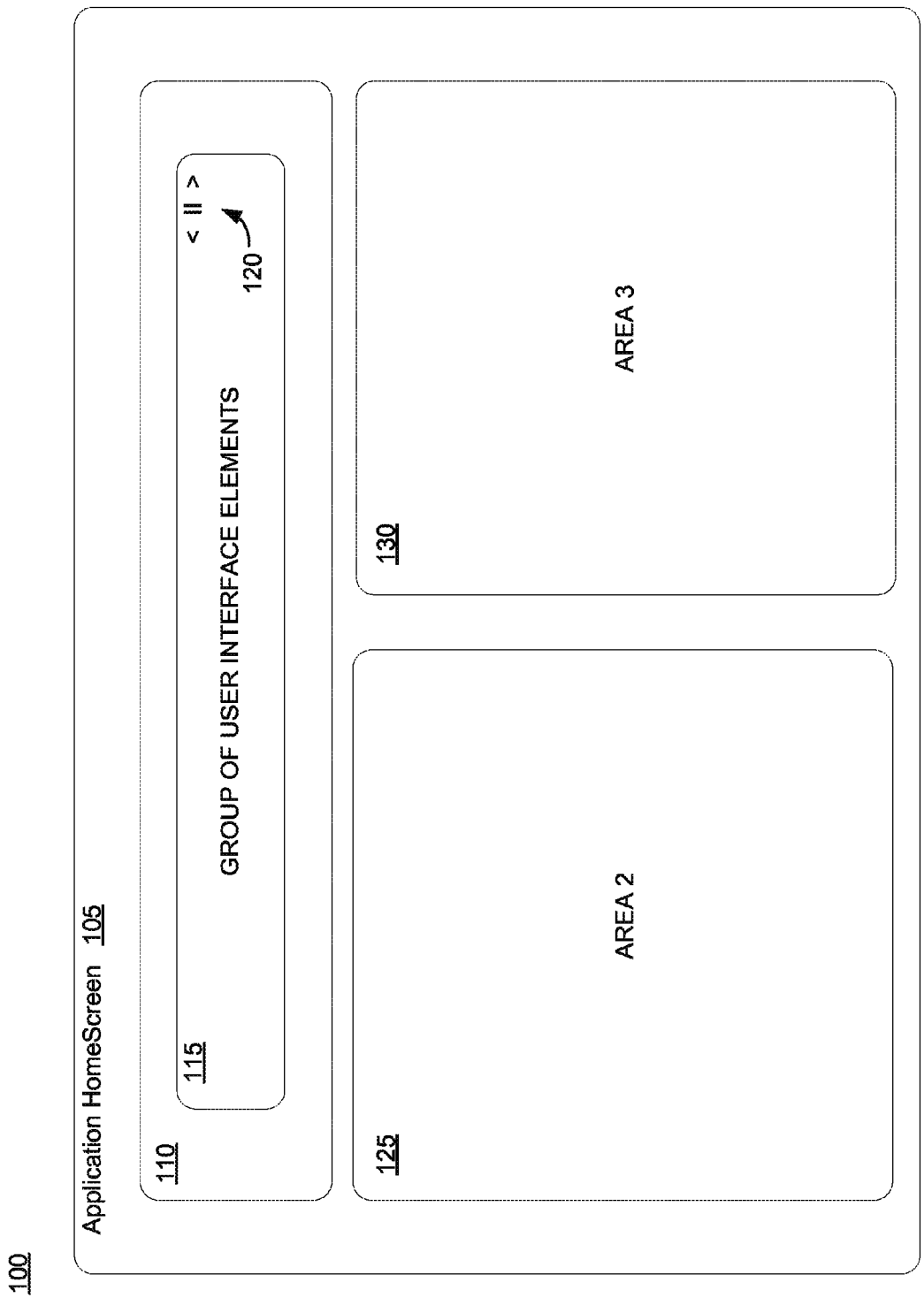
FIG. 1 is an illustrative depiction of a user interface including interactive user interface elements, according to some embodiments herein.

FIG. 1 is an illustrative depiction of a user interface (UI) 100 that may include interactive user interface (UI) elements, according to some embodiments herein. UI 100 may include a home screen, portal, or other point of user interaction of an application, a web site, a cloud-based service, or other system or device. In the example of FIG. 1, UI 100 includes a home screen 100 associated with a first software application. UI 100 further includes an embedded component 110. Embedded component 110 may provide or support, in some embodiments, a mechanism embedded or associated with UI 100 that supports a retrieval of data. In some instances, embedded component 110 may support retrieval of data by facilitating access to one or more data storage locations. In some regards, embedded component 110 may include and/or communicate with components, modules, and interfaces of the one or more data storage locations.

UI 100 also includes a group 115 of user interface elements. The "group" 115 may comprise a plurality of user interface elements (not individually shown in FIG. 1). The plurality of user interface elements belonging to group 115 may be associated with and included in group 115 based on one or more characteristics or attributes of the user interface elements. For example, some of the user interface elements herein may have at least one attribute associated therewith. The attributes may be defined to specify the characteristic(s) and behavior(s) of the UI elements.

In some embodiments, the UI elements in group 115 may be displayed or outwardly presented in UI 100 in, for example, the general area of UI 100 (i.e., area 1) as shown in FIG. 1. UI 100 may include additional areas thereof that are not occupied by embedded component group 115. The example UI depicted in FIG. 1 includes display portions 125 and 130, area 2 and area 3 respectively, that may contain other user interface or component elements other that than the UI elements displayed in group 115.

In some embodiments, the display of UI elements in group 115 may be controlled by a control mechanism 120. In some aspects, the display of UI elements of a group (i.e., the set of UI elements in the group) may be collectively controlled by control mechanism 120. In some embodiments, the UI elements of a group may be displayed simultaneously in a designated area of the UI in which the group is embedded. In some such embodiments, control mechanism 120 may operate control at least some display aspects of the UI elements of the group. For example, control mechanism 120 may provide a mechanism for a user to selectively control the display and navigation of the UI elements in group 115.

By way of an example, a user may manipulate control mechanism 120 to "play" or activate a display of the UI elements of group 115 in the UI 100. When activated to "play", the UI elements may be updated, continually or at least intermittently, to convey current or updated aspects of data element(s) associated with UI elements. In some aspects, the updating of the UI elements may manifest as an animated display of the UI elements.

In some aspects, the active and updated displaying of the UI elements may be "paused" by, for example, de-selecting a "play" button of control mechanism 120. Control mechanism 120 may further include buttons or other user interface selectable controls that facilitate, for example, a forward and/or reverse advancement or scrolling through the one or more groups 115 that may be associated with UI 100. As such, a user may advance from a display of a first group 115 to a second or next group (not shown in FIG. 1) by manipulating control mechanism 120. Likewise, a user may scroll back from a display of a currently displayed group (e.g., 115) to a previous group (not shown in FIG. 1) by manipulating control mechanism 120.

In some embodiments, the UI elements of group 115 may be associated with or correspond to aspects of the information (e.g., data elements, charts, etc.) displayed in UI 100 such as, for example, areas 125 and 130. However, in some other embodiments the UI elements of group 115 need not relate to, be associated with, or correspond to other aspects of UI 100. In some aspects related hereto, the information displayed in a UI in association with the UI elements of the present disclosure may be presented as it is updated.

In some aspects, the configuration of a UI of the present disclosure may vary from the arrangement depicted in the example of FIG. 1. In some instances, a UI according to aspects herein may have more, fewer, alternative, and substitute components arranged in the same, similar, or different configuration, at least in part, than the configuration of FIG. 1.

Figure 2:
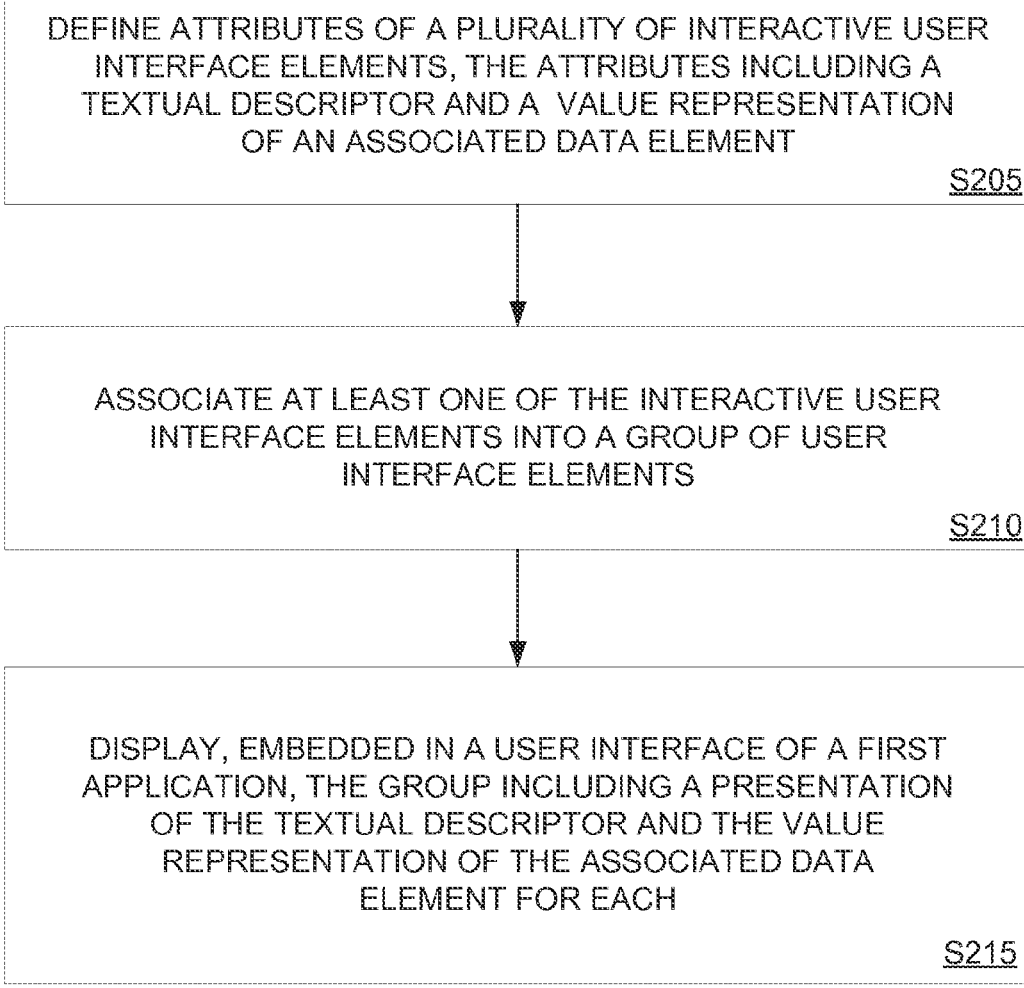
FIG. 2 is a flow diagram of a process, according to some embodiments herein.

FIG. 2 is a flow diagram of a process for presenting UI elements embedded in a UI, in accordance with some aspects herein. Process 200 may, in some aspects, relate to the UI depicted in FIG. 1. In some aspects, process 200 may relate to user interfaces including more, fewer, and components alternative to those depicted in FIG. 1. At S205, attributes of a plurality of interactive UI elements may be defined. In some embodiments, numerous attributes may be associated with the UI elements. In some instances, the UI elements may at least include attributes of a textual descriptor and value representation, where each of these attributes relates to a data element associated with the UI elements.

As used herein, the textual descriptor attribute may define a string of informative text that may be displayed or presented in a UI for the UI element associated therewith. The string of text may comprise one or more words and may confirm to a particular syntax and other rules. In some embodiments, the string of text may generally be unstructured in nature.

As used herein, the value representation attribute may specify that a numerical value representative of an aspect of the data element associated with a UI element be displayed or presented in conjunction with the displaying of the UI element. In some embodiments, the value representation attribute may specify that the value representation be in the form of a graphical representation indicative of a data value. For example, the graphical representation may be a "snapshot" of a graphical visualization of the data element. In some embodiments, the graphical representation of the value representation be a graph, chart, or other graphical rendering. In some embodiments, the value representation attribute may specify that the value representation may be in the form of some textual indicia of a data value. For example, the graphical representation may be the text of a numeric value (e.g., the word "ten"), a text string indicative of a relative value (e.g., "positive" or "negative"; "good", "bad", or "neutral"; and other word(s)).

In some embodiments, the UI elements belonging to an embedded UI group herein may have attributes defining an executable action associated with the UI element. The execution of some of these executable action(s) may be invoked in response to a manipulation of a displayed instance of the UI element in a UI. In some regards, the executable action defined by such attributes may be supported by an embedded component such as, for example, embedded component 110. In some embodiments herein, executing an action in response to initiating the action by manipulating the displayed interactive user interface element may cause the reporting of the action to an application, service, system, or process.

In some embodiments, a UI element of an embedded UI group herein may have attributes specifying data associated with the UI element. Such data, at least portions, versions, and representations thereof, may be retrieved and presented in a UI in conjunction with the displaying of the UI element. The retrievable data specified as being associated with the UI element may be retrieved, in some instances, to update aspects of the UI element displayed in a UI such as, for example, a textual descriptor and/or a value corresponding to a data element. In some aspects, a location of the retrievable data may be specified by an attribute or other aspect associated with the respective UI elements. In some regards, the retrievable data defined by such attributes may be supported by an embedded component of a UI such as, for example, embedded component 110. In some embodiments, the attributes and the values corresponding to those attributes may be defined specifically for each individual UI element.

At operation S210, at least some of the plurality of interactive UI elements of operation S205 may be associated with a group of UI elements. The UI elements associated with a particular "group" may each have the same value for a group attribute of the respective UI elements. Accordingly, in some embodiments, UI elements belonging to the same group may be associated with the same group.

Proceeding to operation S215 of process 200, the group including at least some of the plurality of UI elements is displayed embedded in a UI. The group of UI elements may be displayed in a UI as shown in the example of FIG. 1. However, other UI configurations are encompassed by the present disclosure and the group of UI elements may be presented in other or alternative areas of a UI other than that which is specifically shown in FIG. 1. In accordance with some embodiments herein, the group of displayed UI elements may have a value for the textual descriptor and the value representation values associated with the respective UI elements displayed in conjunction with the UI elements. In some regards, the displaying of the values of the textual descriptor and the value representation of the respective UI elements in conjunction with the UI elements may efficiently and accurately inform and alert a viewer of the UI of pertinent information regarding various aspects of the data element(s) associated with the UI elements. In some regards, the displaying provides a user with a visualization of various aspects of data element(s) via the interactive UI elements embedded in a UI of, for example, an application. The visualization may convey information concerning the data element associated with respective UI elements via the displayed values of the textual descriptors and a relative value and/or "mood" (e.g., good/positive, bad/negative, and neutral) of the UI elements.

In some aspects, the plurality of UI elements may be associated with a plurality of groups. Some such embodiments may support displaying of the plurality of groups of interactive UI elements at least in part by providing a control element or mechanism (e.g., control element 120 for FIG. 1) that a user may use or activate to display a second group of at least one interactive user interface element, wherein the at least one interactive UI element in the second group has associated attributes including, at least, a textual descriptor and a value representation of an associated data element; and displaying, embedded in the user interface of the UI, the second group, including a presentation of values of the textual descriptor and the value representation of the associated data element for each interactive user interface element in the second group. Accordingly, the present disclosure may provide a mechanism to display and navigate one or more groups of interactive UI elements embedded in a UI of an application, browser-accessed website, and a cloud-based service, as well as other systems, devices, and use-case contexts.

Figure 3:
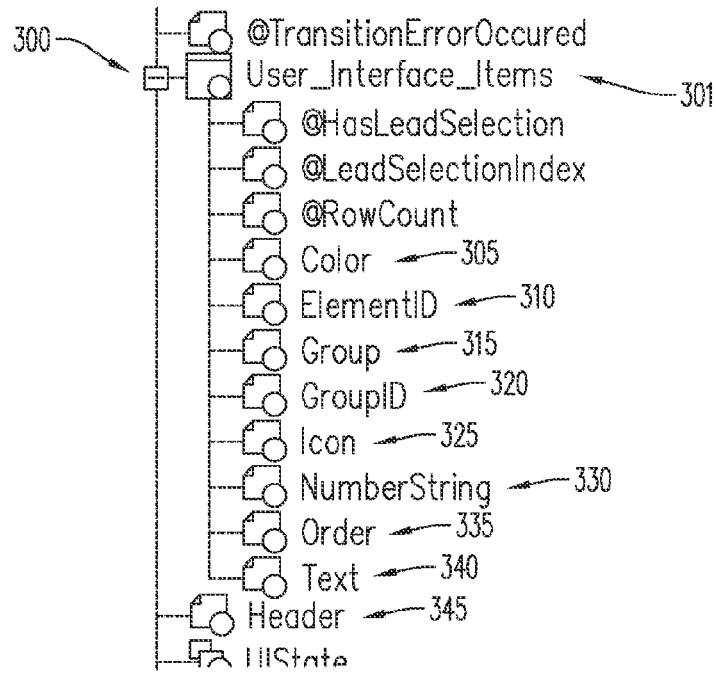
FIG. 3 is an illustrative depiction of some aspects herein, according to some embodiments.

As introduced above, a UI element herein may have one or more attributes associated therewith. In some aspects, a system and method for defining the UI element's attributes and associating the defined attributes with specific UI elements may be provided to support and facilitate the methods and systems disclosed herein. FIG. 3 is an illustrative example representation 300 of some attributes that may be defined for UI elements herein. As illustrated in FIG. 3, a model of a UI element 301 (i.e., User_Interface_Items) is shown as having a number of attributes, including attributes 305-345. Attributes 305-345 are examples of attributes that may be specified for UI elements herein. In some embodiments, the number and type of attributes specified for a UI element may vary to include more, less, and other attributes alternative to those specifically listed in FIG. 3.

Attribute 305 may specify a color to be used to display a UI element. The color may change depending on one or more other attributes or other considerations. For example, a UI element having a "good" or positive value for a specific attribute may be displayed as green, a UI element having a "bad" or negative value for a specific attribute may be displayed as red, and a UI element having neutral value for a specific attribute may be displayed as blue. In some embodiments, the display color of an UI element may be fixed or static.

Attribute 310 may specify a key that will be returned if a user selects a UI element displayed in a UI. This key may be used in processing a request to retrieve data, invoke an action, and other processes such as, for example, generating reports related to the UI element.

Attribute 315 may specify a title to associate with a group of UI elements. In some embodiments, this attribute may comprise a text string. In some aspects, the value of the "group" attribute is the same or equal for each UI element in a same group. Attribute 320 may specify an internal identifier of a group that may be used by a processing system, application, or service interfaced with the UI, including the UI elements herein.

Attribute 325 may specify an icon to display as a representation of a UI element. In some aspects, the icon may be any type of graphic, generally without limit to file type. Attribute 330 may store a number in formatted string format. This attribute may be used to display a numeric value in conjunction with the display of the UI element.

In some embodiments, a group herein may include a plurality of UI elements in the group. Attribute 335 may define an order for displaying the plurality of UI elements in a UI group. The value of this attribute may typically be an integer.

Attribute 340 may define the text that will be displayed as a textual descriptor in conjunction with the display of a UI element. This text may refer to a data element associated with the UI element. In some aspects, the text may be a word or phrase that should typically be understood by a user. Attribute 345 may define a header or title that can be displayed in conjunction with the display of a group of UI elements herein.

Figure 4:
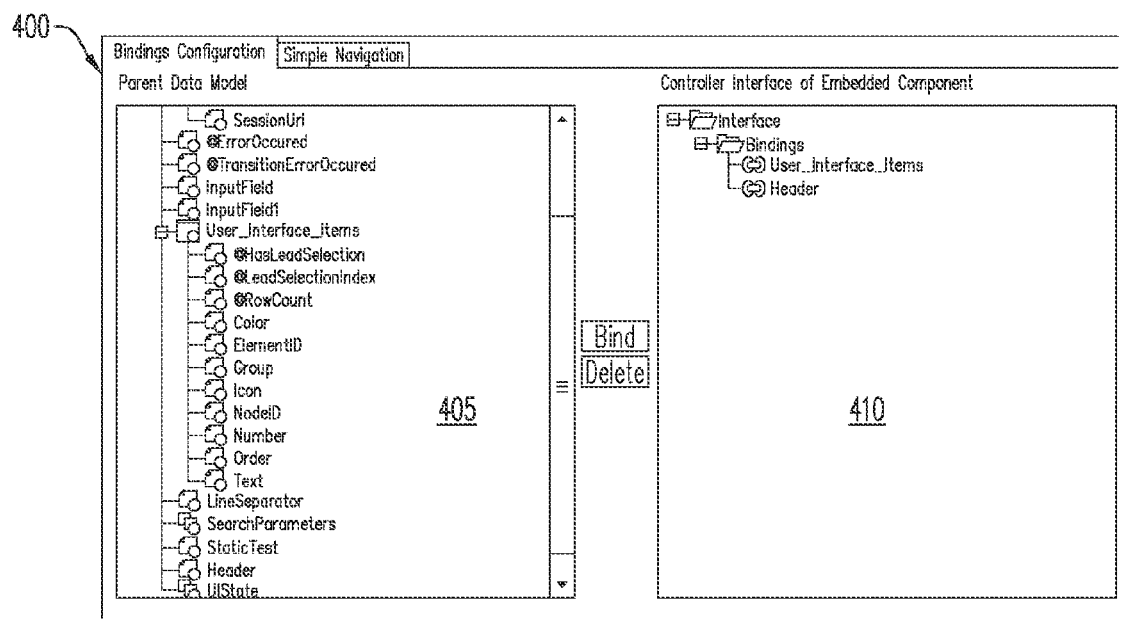
FIG. 4 is an illustrative depiction of some aspects herein, according to some embodiments.

FIG. 400 is an illustrative depiction of a system or tool that may be used to associate or bind a data model as specified in display pane 405 with a particular interface as depicted in display pane 410. In the example of FIG. 4, the development tool provides a mechanism for associating specific attributes of the UI elements herein with a particular interface. It should be appreciated that the tool or system of FIG. 4 is an example of one embodiment, not a limiting constraint of the present disclosure.

Figure 5:
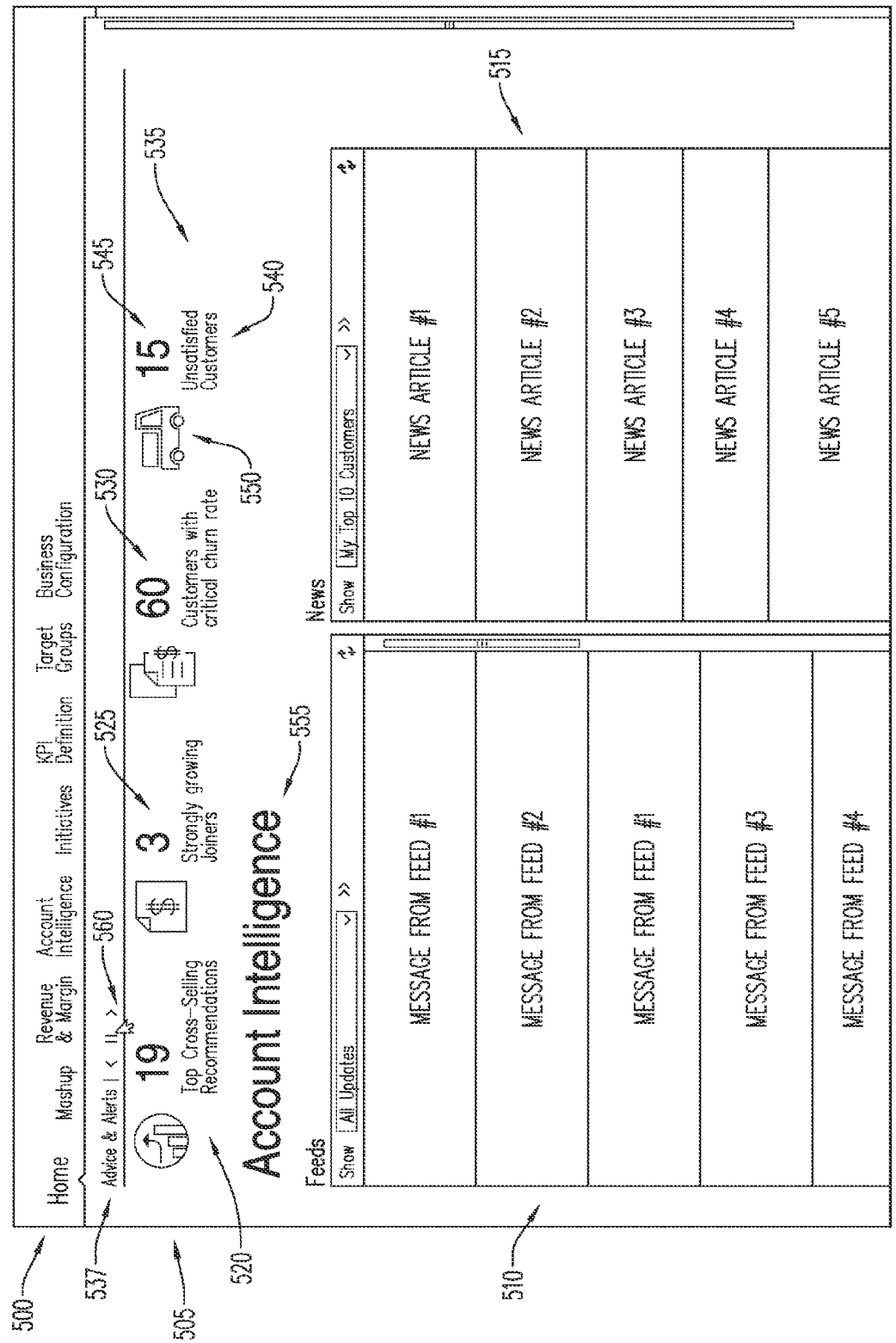
FIG. 5 is an illustrative depiction of some aspects of a user interface including interactive user interface elements, according to some embodiments.

FIG. 5 is an illustrative example of a UI 500, including a group of UI elements 505. Group 505 includes four (4) interactive UI elements 520, 525, 530, and 535. Group 505 may be defined to include and display four UI elements at a given time so as to create, for example, an informative yet uncluttered display of pertinent user-relevant information. Group 505 may be displayed embedded in a "home" page of an application or service as depicted in FIG. 5. As shown, UI 500 includes areas 510 and 515 largely devoted to a primary or first application of the UI 500. Regarding example UI 500, area 510 displays messages from a number of information "feeds" or sources, such as social media networks and email accounts. Area 515 is shown as relating to "news" and displays a number of news articles. The news articles displayed may be an aggregation of news articles selected based on a user's preferences. It should be appreciated that the specific configuration and characteristics of UI 500 may vary, in accordance with other aspects disclosed herein.

Group 505 including UI elements 520, 525, 530, and 535 includes a displayed header of "Advice & Alerts" at 537. The group 505 also has a "group indicator" textual indication of the grouping of "Account Intelligence" at 555. The grouping indicator acts as a display title for the UI elements displayed in FIG. 5. In some aspects, the "group indicator" is further associated with each UI element displayed in group 505 of FIG. 5.

Referring to UI element 535, it is seen that this UI element includes a textual descriptor or text 540 to convey some aspect of a data element associated with the UI element. Here, the text is "Unsatisfied Customers" of a business organization. UI element 535 further includes a numerical value "15" that is also associated with the data element. Here, the number "15" represents the number of unsatisfied customers of the business organization, as determined from a data element associated with the UI element.

In some embodiments as illustrated by UI 535, the UI element may include a graphical icon such as icon 550. In the present example, the icon is a truck. However, the particular icon 550 and the other icons in the group 505 may be specified or defined based on, for example, a user or developer's preferences.

UI 500 includes a control mechanism 560. Control mechanism 560 may comprise one or more UI navigation control components that may be used to control a navigation of group of UI elements and the UI elements therein. For example, control mechanism 560 may be used to navigate the displaying of different groups of UI elements herein. Control mechanism 560 may include a play control button to play/activate the displaying of the UI elements in group 505. In some embodiments, a first selection of the play button initiates the displaying and updating of the information associated with the displayed UI elements. In some embodiments, a second or further selection of the play button of the control mechanism operates to pause the updating of the displayed UI elements.

Figure 6:
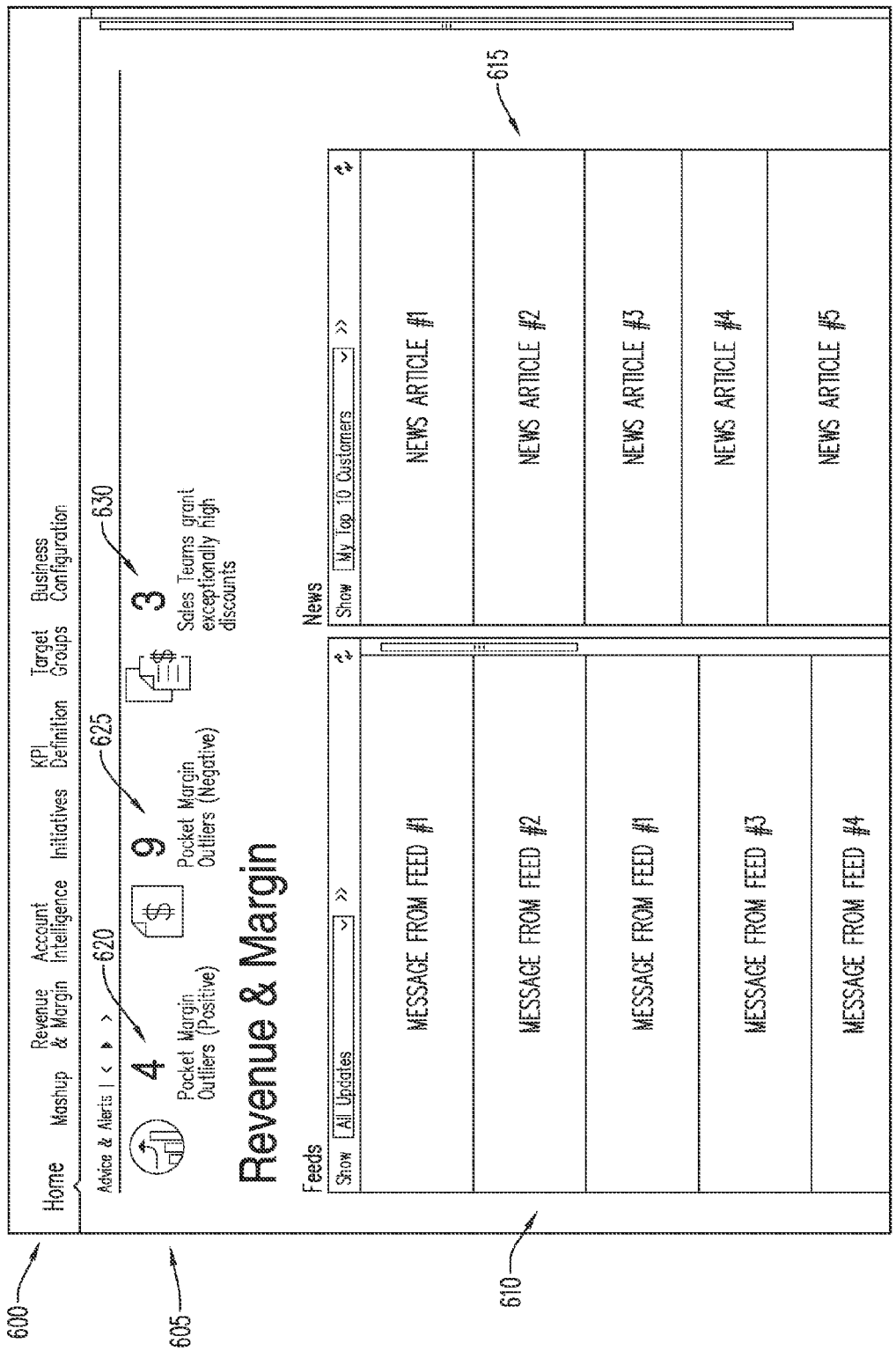
FIG. 6 is yet another illustrative depiction of some aspects of a user interface including interactive user interface elements, according to some embodiments.

FIG. 6 is an example depiction of a UI 600 including a group of UI elements 620, 625, and 530 embedded in a UI of an application or service. UI 600 includes a presentation of a group 605 of interactive UI elements, a first area 610 for displaying messages from a number of messages and a second area 615 for displaying messages from a number of news feeds. In some aspects, FIG. 6 may be similar in many respects to FIG. 5, wherein UI 600 may be the same as or similar to the UI 500 of FIG. 5. A notable difference between the two drawings is the display of group 505 in FIG. 5 and the display of group 605 in FIG. 6. This difference highlights, in part, the flexibility and range of information that may be displayed in a UI in accordance with some aspects disclosed herein.

In some instances, UI 600 may result from manipulating control mechanism 560 to cause group 605 of FIG. 6 to replace the UI group 505 of FIG. 5. The changeover between group 505 and 605 may appear as being animated in the UI's 500 and 600.

Figure 7:
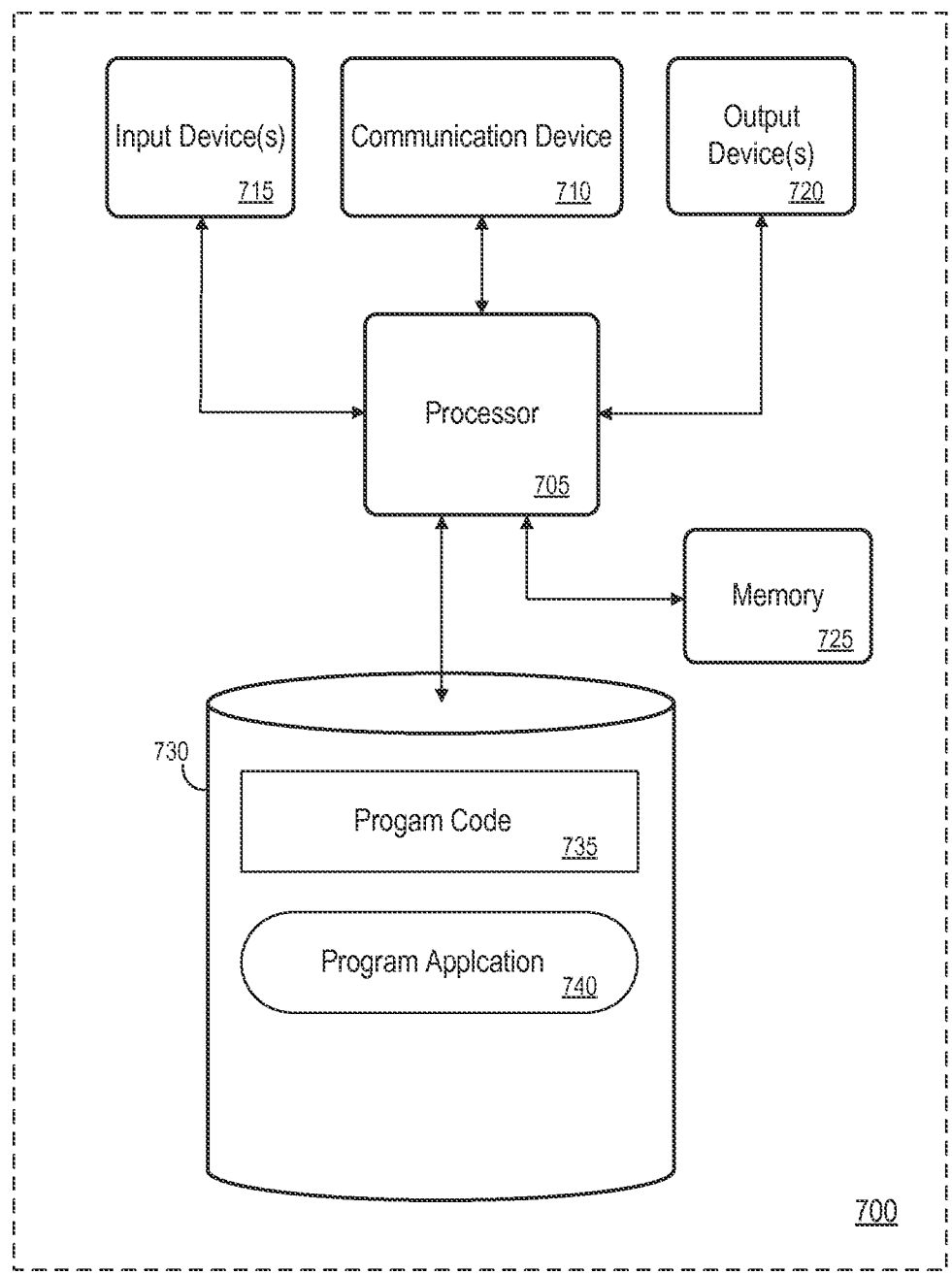
FIG. 7 is a block diagram of a system, in accordance with some embodiments herein.

FIG. 7 is an illustrative block diagram of a system 700 that may be used to implement some embodiments herein. In some aspects, processes disclosed herein may be implemented, at least in part, by system 700. System 700 may comprise a general-purpose computing apparatus and may execute program code to perform any of the processes described herein, such as, but not limited to process 200. System 700 may include elements other than those specifically depicted in FIG. 7, according to some embodiments.

System 700 includes processor 705 operatively coupled to communication device 710, data storage device 730, one or more input devices 715, one or more output devices 720 and memory 725. Communication device 710 may facilitate communication with external devices and networks. Input device(s) 715 may comprise, for example, a keyboard, a keypad, a mouse or other pointing device, a microphone, knob or a switch, an infra-red (IR) port, a docking station, and/or a touch screen. Input device(s) 715 may be used, for example, to enter information into system 700. Output device(s) 720 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Program code 735 of data storage device 730 may be executable by processor 705 to provide any of the processes described herein (e.g., process 200). In some embodiments, program code 735 may include for example, code of an operating system (OS). Embodiments are not limited to execution of these processes by a single apparatus. Application program 740 may include instructions that may be executed by processor 705. Data storage device 730 may also store data and other program code for providing additional functionality and/or which are necessary for operation thereof, such as device drivers, operating system files, etc.

Each system described herein may be implemented by any number of devices in communication via any number of other public and/or private networks. Two or more of the devices herein may be co-located, may be a single device, or may be located remote from one another and may communicate with one another via any known manner of network(s) and/or a dedicated connection. Moreover, each device may comprise any number of hardware and/or software elements suitable to provide the functions described herein as well as any other functions.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, the method comprising:
    defining attributes of a plurality of interactive user interface elements, the attributes including, at least, a textual descriptor and a value representation of an associated data element;
    associating at least one of the interactive user interface elements into a group of user interface elements;
    displaying, embedded in a user interface of a first application, the group of the at least one interactive user interface element, including a presentation of a value for the textual descriptor and the value representation of the associated data element for each interactive user interface element in the group;
    selecting a user interface control element to display a second group of at least one interactive user interface element, wherein the at least one interactive user interface element have associated attributes including, at least, a textual descriptor and a value representation of an associated data element; and
    displaying, embedded in the user interface of the first application, the second group of the at least one interactive user interface element, including a presentation of a value for the textual descriptor and the value representation of the associated data element for each interactive user interface element in the second group.

2. The method of claim 1, wherein the associated data element is related to the first application.

3. The method of claim 1, wherein the textual descriptor is a string of text describing an aspect of the associated data element.

4. The method of claim 1, wherein the value representation of the associated data element is at least one of a numerical value, a graphical representation indicative of a relative value, and a textual indicia of a relative value.

5. The method of claim 1, further comprising associating the plurality of interactive user interface elements with the associated data element.

6. The method of claim 1, wherein the attributes further include at least one of: a specification of retrievable data associated with the associated data element; and an action to execute in response to initiating the action by manipulating the displayed interactive user interface element.

7. The method of claim 6, wherein the attributes include a specification of retrievable data associated with the associated data element and further includes a location of the retrievable data.

8. The method of claim 6, wherein the attributes include an action to execute in response to initiating the action by manipulating the displayed interactive user interface element and further includes reporting the action to the first application or another application.

9. The method of claim 1, wherein all of the interactive user interface elements in the group are displayed simultaneously in the user interface of the first application.

10. A system comprising:
    a memory having program instructions stored thereon; and
    a processor in communication with the memory, the processor being operative to:
        define attributes of a plurality of interactive user interface elements, the attributes including, at least, a textual descriptor and a value representation of an associated data element;
        associate at least one of the interactive user interface elements into a group of user interface elements;
        display, embedded in a user interface of a first application, the group of the at least one interactive user interface element, including a presentation of a value for the textual descriptor and the value representation of the associated data element for each interactive user interface element in the group;
        select a user interface control element to display a second group of at least one interactive user interface element, wherein the at least one interactive user interface element has associated attributes including, at least, a textual descriptor and a value representation of an associated data element; and display, embedded in the user interface of the first application, the second group of the at least one interactive user interface element, including a presentation of a value for the textual descriptor and the value representation of the associated data element for each interactive user interface element in the second croup.

11. The system of claim 10, wherein the associated data element is related to the first application.

12. The system of claim 10, wherein the textual descriptor is a string of text describing an aspect of the associated data element.

13. The system of claim 10, wherein the value representation of the associated data element is at least one of a numerical value, a graphical representation indicative of a relative value, and a textual indicia of a relative value.

14. The system of claim 10, further comprising associating the plurality of interactive user interface elements with the associated data element.

15. The system of claim 10, wherein the attributes further include at least one of: a specification of retrievable data associated with the associated data element; and an action to execute in response to initiating the action by manipulating the displayed interactive user interface element.

16. The system of claim 15, wherein the attributes include a specification of retrievable data associated with the associated data element and further includes a location of the retrievable data.

17. The system of claim 15, wherein the attributes include an action to execute in response to initiating the action by manipulating the displayed interactive user interface element and further includes reporting the action to the first application or another application.

18. The system of claim 10, wherein all of the interactive user interface elements in the group are displayed simultaneously in the user interface of the first application.

\* \* \* \* \*